United States Patent [19]
Chiang et al.

[11] Patent Number: 6,101,552
[45] Date of Patent: Aug. 8, 2000

[54] VIRTUAL INTERNET PROTOCOL GATE AND THE NETWORK CONSTRUCTED WITH THE SAME

[76] Inventors: Yen-Yuan Chiang, 6F, No. 100-1, Tung-Ming Street, Hsinchu; Hsiao-Ping Tsai, 2F, No. 10, Lane 151, Ching-Ping Road, Chung-Ho City, Taipei Hsien; Chung-Ping Chung, 5F, No. 7, Lane 70, Chien-Kung I Road, Lin 34, Chun-Kung Li, East District, Hsinchu, all of Taiwan

[21] Appl. No.: 09/166,994

[22] Filed: Oct. 6, 1998

[30] Foreign Application Priority Data

Oct. 8, 1997 [TW] Taiwan ................................. 86114790

[51] Int. Cl.⁷ ..................................................... G06F 13/00
[52] U.S. Cl. ........................... 709/245; 709/203; 709/218
[58] Field of Search .................................... 709/245, 217, 709/218, 219, 203

[56] References Cited

U.S. PATENT DOCUMENTS

| | | | |
|---|---|---|---|
| 5,434,974 | 7/1995 | Loucks et al. | 707/101 |
| 5,774,660 | 6/1998 | Brendel et al. | 709/201 |
| 5,923,854 | 7/1999 | Bell et al. | 709/243 |
| 6,026,445 | 7/1999 | Kephart et al. | 709/245 |

*Primary Examiner*—Kenneth R. Coulter
*Attorney, Agent, or Firm*—Harness, Dickey & Pierce, P.L.C.

[57] ABSTRACT

A virtual internet protocol (IP) gate, between a legitimate internet and a virtual internet, can reuse the internet address in a specific range of the legitimate internet addresses for resolving the insufficiency of IP addressing. The virtual IP gate at least comprises a connection module, a selection module and an address conversion module. The connection module establishes connection with the virtual internet by using at least a virtual internet address and establishes connection with the internet by using at least an internet address with the address not within the aforementioned range. The selection module corresponds to a selection port number and receives a transmission packet from a processing module on the legitimate internet to the virtual internet when establishing the connection (including connection-oriented connection and connectionless connection), wherein the <source address: source port number> and <destination address: destination port number> of the delivery packet are the <processing internet address: processing port number> of the processing module and the <internet address of virtual IP gate: the selection port number> of the selection module. Besides, the selection module, in response to a source console, notifies the destination console on the virtual internet of all console names, and transmits the delivery packet to the destination console according to a console selection signal provided by the processing. And an address conversion module is used for converting the addresses between the legitimate internet and the virtual internet.

16 Claims, 4 Drawing Sheets

| Bit 0 | | | Bit 31 | |
|---|---|---|---|---|
| VERS | HLEN | Service Type | Total Length | |
| Identification | | | Flag | Sector movement |
| Duration | | Protocol | Header Check Sum | |
| Source Address | | | | |
| Destination Address | | | | |
| IP Options (May not exist) | | | Additional characters | |
| IP Data Sector (up to 65535 byte) | | | | |

FIG. 2B

| Bit 0 | | | Bit 31 |
|---|---|---|---|
| Source Port Number | | Destination Port Number | |
| Serial Number | | | |
| Response Number | | | |
| Data Gap | Reserved | | Windows |
| Check Sum | | Emergent Indicator | |
| Options | | Bit Insert | |
| TCR Data | | | |

FIG. 2C

VIRTUAL INTERNET PROTOCOL GATE AND THE NETWORK CONSTRUCTED WITH THE SAME

BACKGROUND OF THE INVENTION

1. Field of the Invention

The present invention relates generally to an intranet gateway, and particularly to a virtual IP gate and the networking system constructed with the same, for connecting a legitimate internet with a plurality of virtual internets. In this networking system, various internets can repeatedly use the internet addresses within the same range, thus, the limited internet addresses can be further expanded.

2. Description of the Related Art

The rapid growth in Internet has obviously depleted the available IP addresses as specified in IPv4 protocol. Consequently, IP addresses of the so-called IPv6 protocol are proposed to expand the length of current IP addresses from 32 bits to 128 bits, so that the capacity of current IP addresses will be greatly increased and the insufficiency of IP addressing be resolved.

However, such a proposition has encountered complication in reality. Since most Internet devices currently used are based on the framework specified in IPv4 protocol and will need to be replaced once IP addresses of IPv4 are changed. This proposition will result in inestimable expenses and restrict the promotion of IP addressing and their developments.

Therefore, a principal object of the present invention is to provide a virtual IP gate, which can operate in the existing IP protocol, reuse the IP addresses in a specific range of IPv4 and further expand available IP address dimensions to resolve the insufficiency of IP addressing.

To achieve the aforementioned object, the present invention provides a virtual IP gate, which is interposed between a legitimate internet and a virtual internet, wherein the virtual internet addresses are selected from a specific range of the legitimate internet addresses. Moreover, the virtual IP gate comprises at least a connection module, a selection module and an address conversion module.

Therein, the connection module establishes a connection with the virtual internet using at least a virtual internet address in the specified range of the legitimate internet addresses and a connection with the legitimate internet using at least an internet address not in the specified range of the legitimate internet addresses.

The selection module corresponds to a selected port number, whereby the selected port number normally represents a specific application, such as the selected port number of Telnet being 23 and the selected port number of FTP being 21; the selection module receives a delivery packet from a processing module of the legitimate internet to the virtual internet when establishing the connection (including connection-oriented and connectionless connections). The <source address: source port number> and <destination address: destination port number> of the delivery packet are <processing internet address: processing port number> of the processing module and <virtual internet address: the selected port number> of the selection module. (Please note: the name server system will respond to the processing module that the virtual internet address of the selection module is the virtual internet address of the virtual IP gate.) Moreover, the selection module can be used to open a window or a list enlisting all console names or connections indices of the virtual internet when the connection is first established, and acquire a virtual internet address of a destination console in the virtual internet for transferring the delivery packet to the destination console. The selection module can process both connection-oriented and connectionless connections. In the case of connection-oriented connection, when the selection module needs to recycle system resources, it can initiate system resources recycling after determining whether it receives a control packet indicating the end of the connection or receives no delivery in a specified time frame. In the case of connectionless connection, the selection will initiate system resources recycling after receiving no delivery in a specified time frame since no control packet indicating the end of the connection will be received.

And an address conversion module, corresponding to an address conversion port number, is for receiving a transmission packet from a first processing module of the virtual internet to a second processing module of the legitimate internet, wherein the <source address: source port number> and <destination address: destination port number> of the transmission packet are <first processing virtual internet address: first processing port number> of the first processing module and <second processing internet address: second processing port number> of the second processing module.

The address conversion module is for recording the <first processing virtual internet address: first processing port number> of the first processing module and taking <internet address of virtual IP gate: address conversion port number> of the address conversion module and <second processing internet address: second processing port number> of the second processing module as the <source address: source port number> and <destination address: destination port number> of the transmission packet for forwarding the transmission packet to the second processing module.

The address conversion module is also for receiving a response packet from the second processing module to the first processing module, wherein the <source address: source port number> and <destination address: destination port number> of the response packet are <second processing internet address: second processing port number> of the second processing module and <internet address of virtual IP gate: address conversion port number> of the address conversion module, the address conversion module replaces <internet address of virtual IP gate: address conversion port number> with <first processing internet address: first processing port number> of the first processing module recorded in the address conversion module as the <destination address: destination port number> of the response packet, whereas <source address: source port number> of the responses packet remain unchanged, for transmitting the response packet back to the first processing module.

Furthermore, the above address conversion module can be used for receiving a second transmission packet from a third processing module of the legitimate internet to a fourth processing module of the virtual internet, wherein the <source address: source port number> and <destination address: destination port number> of the second transmission packet are <third processing internet address: third processing number> of the third processing module and <fourth processing internet address: fourth processing port number> of the fourth processing module. (Please note: the name server system will respond to the third processing module, the fourth processing internet address is the internet address of the virtual IP gate.)

When the second transmission packet is transmitted to the virtual IP gate, the selection module is then activated in response to the third processing module to notify the third processing module of all console names or connection indices on the virtual internet, including the console name of the fourth processing module. The third processing module then convert the console name of the fourth processing module into virtual internet address of the fourth processing module based on the name selection signal of the fourth processing module provided by the third processing module, and reactivate the address conversion module after being inquired by the virtual IP gate.

The address conversion module records the connection relationship between <third processing internet address: third processing port number> of the third processing module and <virtual internet address of virtual IP gate: fourth processing port number>, and takes <virtual internet address of virtual IP gate: address conversion port number> of the address conversion module and <fourth processing virtual internet address: fourth processing port number> of the fourth processing module as the <source address: source port number> and <destination address: destination port number> of the second transmission packet, so as to transmit the second transmission packet to the fourth processing module of the virtual internet.

And the address conversion module is used for receiving a second response packet transmitted from the fourth processing module to the third processing module, wherein the <source address: source port number> and <destination address: destination port number> of the second response packet are <fourth processing virtual internet address: fourth processing port number> of the fourth processing module and <virtual internet address of virtual IP gate: address conversion port number> of the address conversion module, the address conversion module replaces <source address: source port number> with <destination address: destination port number> based on the recorded corresponding relationship, take <internet address of virtual IP gate: fourth processing port number> and <third processing internet address: third processing port number> of the third processing module as the <source address: source port number> and <destination address: destination port address> of the second response packet, and transmits the second response packet back to the third processing module of the legitimate internet.

Moreover, in the virtual IP gate of this invention, the source console corresponding to the transmission packet may also comprise a name recording module for recording destination console names when the connection is initiated.

And the virtual IP gate further comprises an automatic connection module for inquiring the source console when the delivery packet is received for the first time and for acquiring the destination console name of the delivery packet. The destination console name is recorded in the name recording module of the aforementioned source console. The virtual IP gate, upon receiving the destination console name, then transfers the delivery packet to the destination console on the virtual internet based on the virtual internet address it has acquired from the destination console name.

Furthermore, in the virtual IP gate of this invention, a legitimate internet comprises a name server module for recording part of legitimate console names and their corresponding legitimate internet addresses and for assigning the internet address corresponding to each console name on the virtual internet as legitimate internet address of the virtual IP gate, and further check for insufficiency through the name server system on the internet upon inquiring about the corresponding internet address according to console name.

Moreover, the networking framework constructed with the aforementioned virtual IP gate may be connected to a legitimate internet and a plurality of virtual internets by virtue of a plurality of IP gates, and hence the virtual internets may extend the limitation of internet addresses by using the legitimate internet addresses within the same range.

BRIEF DESCRIPTION OF THE DRAWINGS

The aforementioned objects, features and advantages will become clear from the following detailed description of preferred embodiments with reference to the accompanied drawings, wherein:

FIG. 2B illustrates the format of an TCP header of FIG. 2A;

FIG. 2C illustrates the format of an IP header of FIG. 2A; and

DESCRIPTION OF THE PREFERRED EMBODIMENTS

First Embodiment

Figure 1:
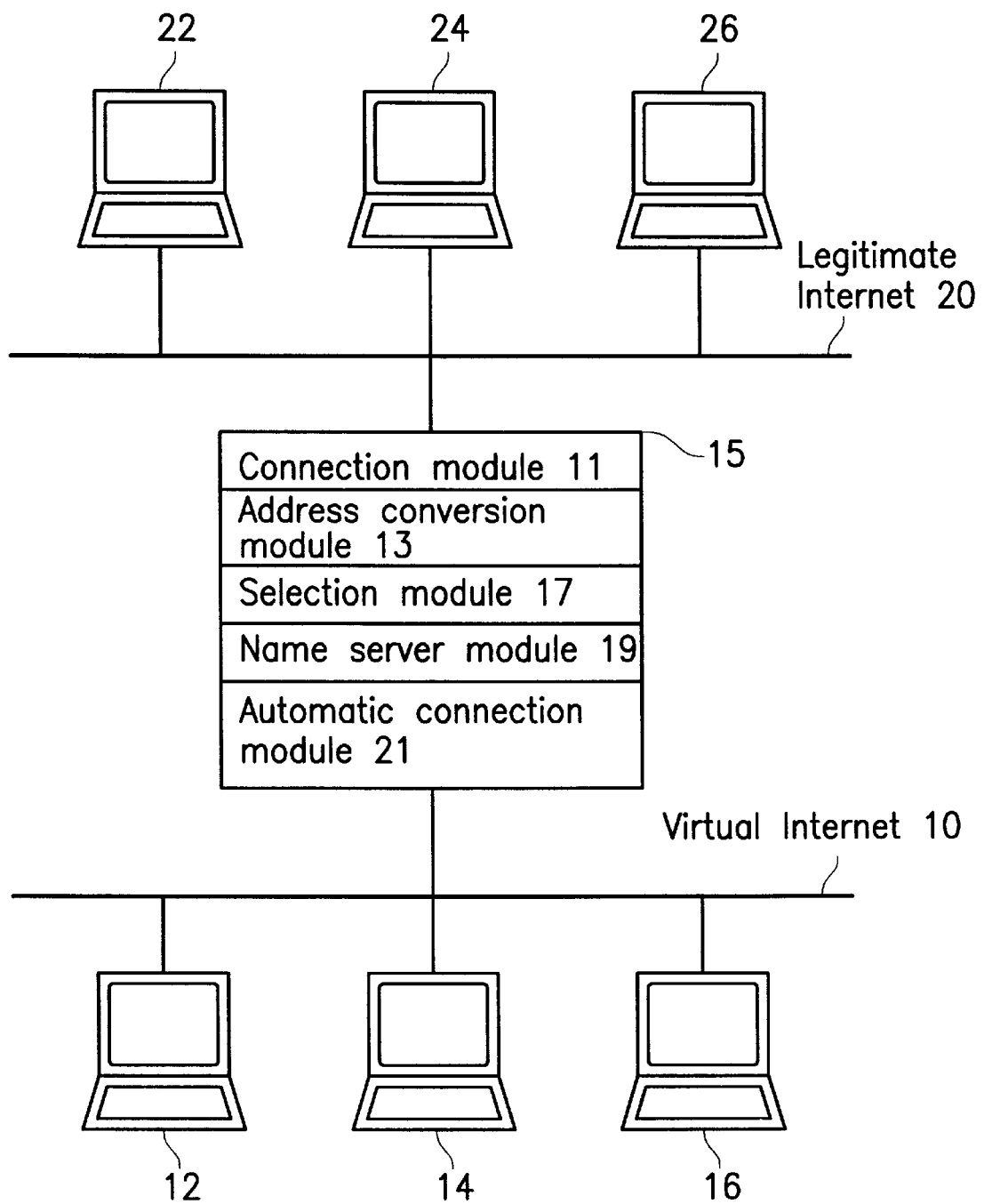
FIG. 1 illustrates an internet structure of an IP gate according to a first embodiment of the present invention.

Refer to FIG. 1, which illustrates an internet structure of a virtual IP gate according to the present invention, wherein the networking structure comprises at least a legitimate internet 20 and a virtual internet 10, with a virtual IP gate 15 amid the legitimate internet 20 and virtual internet 10, for receiving and transmitting data packets, such as TCP/IP protocol packets, between both networks. Moreover, the virtual internet addresses are selected from a specific range of the legitimate internet addresses.

This embodiment for instance may, firstly, allocate a specified quantity of internet addresses from the addressing space of the legitimate internet 20 (such as 256 or 65636 internet addresses from current internet addresses of IPv4 protocol) as the internet addressing space of virtual internet 10 and name these addresses as the virtual internet addresses. These addresses need no particular restriction and the addresses in the same range can be reused without affecting the operating mechanism of the original legitimate internet 20.

The virtual IP gate 15 of this invention comprises a connection module 11, an address conversion module 13, a selection module 17, a name server module 19 and an automatic connection module 21.

Therein, the connection module establishes connection to a virtual internet through at least a virtual internet address of the specified addresses and establishes connection to the legitimate internet through at least a legitimate internet address of the specified addresses. In this embodiment, virtual IP gate 15 may have at least a legitimate internet address and at least a virtual internet address for establishing connection to the legitimate internet 20 and the virtual internet 10. Therefore, the virtual IP gate 15 can be identified by the legitimate internet 20 and the virtual internet 10. Moreover, since the connection module 11 is located on the virtual IP gate 15, and the virtual IP gate 15 is between the two internets, any information, such as TCP/IP packets sent from the legitimate (virtual) internet 20 (10) to the virtual (legitimate) internet 10 (20), has to first go through virtual IP gate 15 for transmission.

An address conversion module corresponds to an address conversion port number, which is an unused number randomly selected from 0–65535, for receiving a transmission packet transmitted from a first processing module of the virtual internet 10 to a second processing module of the legitimate internet 20, wherein the <source address: source port number> and <destination address: destination port number> of the transmission packet are <first processing virtual internet address: first processing port number> of the first processing module and <second processing internet address: second processing port number> of the second processing module.

The address conversion module 13 records the <first processing virtual internet address: first processing port number> of the first processing module and takes the <internet address of virtual IP gate: address conversion port number> of the address conversion module and <second processing internet address: second processing port number> of the second processing module as the <source address: source port number> and <destination address: destination port number> of the transmission packet for transmitting the transmission packet to the second processing module.

And the address conversion module is used for receiving a response packet transmitted from the second processing module to the first processing module, wherein the <source address: source port number> and <destination address: destination port number> of the response packet are <second processing virtual internet address: second conversion port number> of the second processing module and <internet address of virtual IP gate: address conversion port number> of the address conversion module, the address conversion module then replaces the <internet address of virtual IP gate: address conversion port number> with <first processing virtual internet address: first processing port number> recorded in the address conversion module as <destination address: destination port number> of the response packet, whereas <source address: source port number> remain unchanged, for transmitting the response packet back to the first processing module.

Moreover, the address conversion module is for receiving a second transmission packet transmitted from a third processing module of the legitimate internet to a fourth processing module of the virtual internet, wherein the <source address: source port number> and <destination address: destination port number> of the second transmission packet are <third processing internet address: third processing port number> of the third processing module and <internet address of virtual IP gate: fourth processing port number> of the virtual IP gate. (Please note: since name server module 19 will respond to the third processing module, the address of the fourth processing module serves as the internet address of the virtual IP gate 15.)

When the second transmission packet is transmitted to the virtual IP gate when establishing connection (including connection-oriented and connectionless connection), the selection module is then activated in response to the third processing module to notify the third processing module of all console names or connection indices on the virtual internet. (Please note: the information includes the console name of the fourth processing module.) The third processing module then convert the console name of the fourth processing module into virtual internet address of the fourth processing module based on the name selection signal of the fourth processing module provided by the third processing module, and reactivate the address conversion module 13 after being inquired by the virtual IP gate 15.

The address conversion module 13 records the connection relationship between the <third processing internet address: third processing port number> of the third processing module and <virtual internet address of virtual IP gate: fourth processing port number> and takes <virtual internet address of virtual IP gate: address conversion port number> of the address conversion module and <fourth processing virtual internet address: fourth processing port number> of the fourth processing module as the <source address: source port number> and <destination address: destination port number> of the second transmission packet so as to transmit the second transmission packet to the fourth processing module.

And the address conversion module is used for receiving a second response packet transmitted from the fourth processing module to the third processing module, wherein the <source address: source port number> and <destination address: destination port number> of the second response packet are <fourth processing virtual internet address: fourth processing port number> of the fourth processing module and <virtual internet address of virtual IP gate: address conversion port number> of the address conversion module, the address conversion module 13 then replaces <source address: source port number> with <destination address: destination port number> based on the recorded corresponding relationship, takes <internet address of virtual IP gate: fourth processing port number> and <third processing internet address: third processing port number> of the third processing module as the <source address: source port number> and <destination address: destination port address> of the second response packet, and transmits the second response packet back to the third processing module.

To illustrate, when a source console 10 on the virtual internet 10 wants to connect with another destination console 14 on the same virtual internet 10, since the two consoles are located on the same internet site, the virtual internet 10 is able to connect the two consoles simply through regular internet routing mechanism without entering into the legitimate internet 20.

However, when the first processing module (not shown) of a source console 12 on the virtual internet 10 wants to connect with another destination console 22 on the legitimate internet 10, since the two consoles are located on the different internet systems, the first processing module of the source console 12 is unable to directly transmit packets (such as TCP/IP protocol packets) to the second processing module of the destination console 22 through regular routing mechanism, instead it needs to first transmit the packet to the virtual IP gate 15 (between the legitimate internet 20 and virtual internet 10).

The address conversion module 13 will undertake appropriate processing (to be discussed later) based on the <source address: source port number> and <destination address: destination port number> of the transmission packet to ensure the transmission packet completes the connection between the two internets without affecting the operating mechanism of the legitimate internet.

Figure 2A:
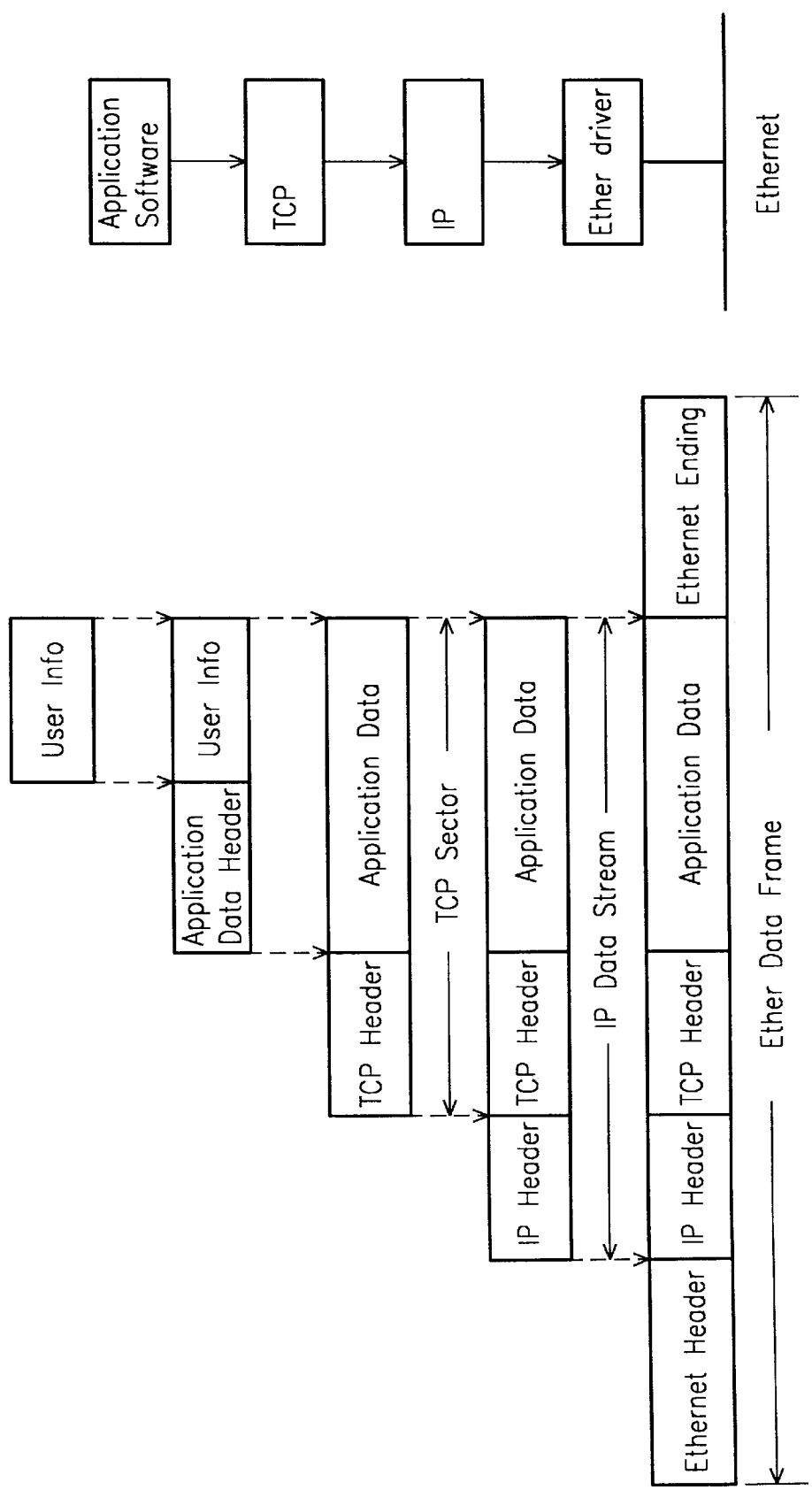
FIG. 2A illustrates the format of an TCP/IP protocol packet.

Refer to FIG. 2A, which illustrates the format of a currently used IP packet, that is, a TCP/IP protocol packet. As shown in the FIG., each TCP/IP protocol packet contains an IP header and a TCP header. FIGS. 2B and FIG. 2C illustrate the basic format of an IP header and an TCP header of a TCP/IP protocol packet, wherein the IP header has a set of <source address: destination address> corresponding respectively to the console that transmits the transmission packet and the console that receives the packet; whereas the TCP header has a set of <source port number: destination port number> corresponding respectively to the processing that transmits the transmission packet and the processing that receives the packet. In other words, any TCP/IP packet contains a set of <source address: source port number>corresponding to source processing and <destination address: destination port number> corresponding to destination processing.

And the address conversion module 13 takes the advantage of this feature for undertaking the processing.

Firstly, when the virtual IP gate 15 receives a transmission packet transmitted from a first processing module on virtual internet 10 to a second processing module on the legitimate internet 20, it activates an address conversion module 13 on an unused communication port (thereafter, address conversion port number), wherein the <source address: source port number> and <destination address: destination port number> of the transmission packet are <first processing virtual internet address: first processing port number> of the first processing module and <second processing internet address: second processing port number> of the second processing module.

Next, the address conversion module 13 records the <source address: source port number> of the first processing module and takes <internet address of virtual IP gate: address conversion port number> of the address conversion module 13 and <second processing internet address: second processing port number> as the <source address: source port number> and <destination address: destination port number> of the transmission packet for transmitting the transmission packet to the second processing module.

Therefore, the second processing module considers its connection with the virtual IP gate 15 (address conversion module 13) being completed upon receiving the transmission packet. Furthermore, the second processing module directly transmits the response packet to the opened address conversion module 13 on the virtual IP gate 15 when it wants to transmit the response packet back to the first processing module. Please note that the <source address: source port number> and <destination address: destination port number> are the basis of identification for processing, therefore, the response packet can be correctly transmitted to the address conversion module 13 corresponding to the virtual IP gate 15, when the second processing module needs to transmit the response packet back to the first processing module.

And the address conversion module 13, upon receiving the response packet retransmitted from the second processing module to the first processing module, takes the <source address: source port number> and <destination address: destination port number> as <second processing virtual internet address: second conversion port number> of the second processing module and <internet address of virtual IP gate: address conversion port number> of the address conversion module 13, respectively. That is, the second processing module will consider having established connection with the virtual IP gate 15. Then, the address conversion module 13 will replace <internet address of virtual IP gate: address conversion port number> with <first processing virtual internet address: first processing port number> of the previously recorded address conversion module as the <destination address: destination port number> of the response packet, whereas <source address: source port number> remain unchanged, for transmitting the response packet back to the first processing module.

In this embodiment, since the transmission packet is connected by way of connection-oriented connection (TCP protocol), the virtual IP gate 15 can determine whether the address conversion module 13 receives a disconnection control packet from the connection, or initiates system resources recycling when no transmission occurs after a specified time elapses. In the case of a connectionless connection, where no disconnection control packet will be received, system resources recycling will be initiated when no transmission occurs after a specified time elapses.

Since a disconnection control packet may be lost when the connection-oriented connection goes wrong, so the end of the address conversion module can be realized by setting a timer to the virtual IP gate 15 for system resources recycling.

Furthermore, the virtual IP gate 15 of this invention also comprises a selection module 17, corresponding to a selection port number, for receiving the delivery packet transmitted from a third processing module to the legitimate internet 20 when a connection (including connection-oriented and connectionless connections) is being established. Therein, the <source address: source port number> and <destination address: destination port number> of the delivery packet are <third processing internet address: third processing port number> of the third processing module and <internet address of virtual IP gate: the selection port number> of the selection module. (Please note: the name module 19 will respond to the third processing module, the address of the fourth processing module serves as the internet address of the virtual IP gate.)

Moreover, the selection module 17, in response to source console, notifies the third processing module of all console names or connection indices on the virtual internet. The third processing module then convert the console name of the fourth processing module into a virtual internet address of the fourth processing module based on the name selection signal of the fourth processing module provided by the third processing module and inquired by the virtual IP gate 15, and then reactivate the address conversion module 13.

In the processing of the third processing module, the console names (such as Telnet or FTP) or connection indices will be listed, virtual IP gate 15 may use a console name or a selection signal of the connection index provided by the third processing module to inquire and acquire the virtual internet address of the destination console on the virtual internet 10 for transmitting the transmission packet to the destination console on the virtual internet 10. Besides, the selection module may also provide a function of auditing access privileges and expel unauthorized users.

For example, when a source console 24 on a legitimate internet 20 needs connect (or transmit a delivery packet) to a specific destination console 12 on a virtual internet 10, the source console will first inquire through the name server system (not shown) the name server module 19 (to be discussed later) when transmitting a transmission packet to the virtual IP gate 15. (Please note: Name server module records partial console names on the legitimate internet 20 and their corresponding legitimate internet addresses and takes the internet addresses on the virtual IP gate as legitimate internet addresses to correspond to each console name on the virtual internet 10. In the process of searching for internet addresses corresponding to each console name, the name server system will search through the internet console names not recorded on this name server module.) Therefore, the source address and destination address of the delivery packet are the legitimate internet address corresponding to the source console 24 and the legitimate address of the virtual IP gate, respectively. At this time, the source console 24 is not the console that directly transmits transmission packet to the virtual internet 10, but rather links to the virtual IP gate 15 with an application module (such as Telnet, FTP and Browser).

Subsequently, the virtual IP gate 15 activates a selection module 17 with a specific communication port number (selected port number), the selection module 17, in response to the source console 24, notifies the processing module of the source console 24 of the console names of all such service-providers and activates address conversion module 13 by inquiring and acquiring virtual internet addresses of the destination console 12 on the virtual internet 10 based on the console name selection signal (selected destination console 12) provided by the processing module of the source console 12 to transmit the delivery packet to the destination console 112 of the virtual internet 10.

This connecting action includes maintaining two connections, namely: the connection established between the source console 24 on a legitimate internet 20 and the virtual IP gate 15, and the connection established between the virtual IP gate 15 and the destination console 12 on the virtual internet 10. The information on these two nets can be exchanged through these two connections.

Moreover, in this invention, if the source console comprises a name recording module for recording its corresponding console name upon establishing a connection, then the virtual IP gate 15 may also comprise an automatic connection module 21 for inquiring the source destination upon receiving the transmission packet at the initial connection and for acquiring the destination console name corresponding to the delivery packet to transmit the delivery packet to the destination console on the virtual internet 10.

In this example, when a processing module of a source console 26 on the legitimate internet 20 uses the console name of a destination console 16 on the virtual internet 10 to establish an external connection, a name recording module of the source console 26 will first record the console name of the destination console 16, then deliver the transmission packet to the legitimate internet 20 and deliver according to a domain name system (DNS) to the corresponding name server module to acquire the internet address corresponding to the console name of the the destination console (that is, the legitimate internet address of the virtual IP gate 15). Since a domain name system is an automation system, each local network has in effect its own specified free right on console name. In this embodiment, the virtual IP gate 15 or other preselected consoles can serve as the name server module 19 of the virtual internet 10 (the name server module 19 as shown in the FIG. is provided by the virtual IP gate 15). When an application module on the legitimate internet 20 inquires about a console name on the virtual internet 10, the name server module 19 will have to respond to the application module on a legitimate internet address of the virtual IP gate 15, so the application module will deliver transmission packet to the virtual IP gate 15 according to the address.

The virtual internet IP gate, upon receiving the transmission packet, will create an automatic connection module 21, retransmit an inquiry signal to the name recording module of the original source console 26 to acquire the destination console name of the transmission packet. (The console name in the original TCP/IP protocol stack will be discarded when the domain name system obtains an internet address.) The automatic connection module 21, upon acquiring the console name, may find the address corresponding to the destination console 16 on virtual internet 10. The following sections are the same as those specified in the aforementioned embodiment. The virtual IP gate 15 will maintain two connections, namely, the connection established between the source console 26 of the legitimate internet 20 and the virtual IP gate 15 and the connection established between the virtual IP gate 15 and the destination console 16 on the virtual internet 10. The object of transmitting data between the two networks is therefore achieved.

Second Embodiment

Figure 3:
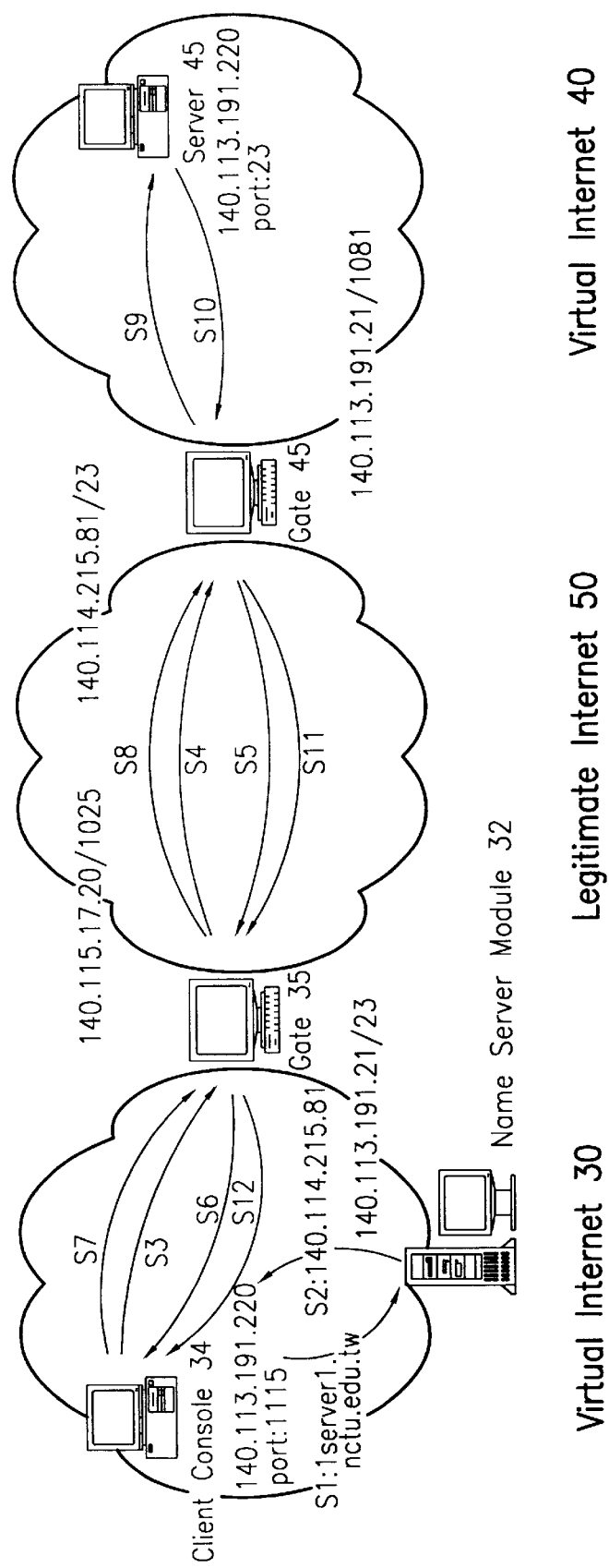
FIG. 3 illustrates an internet structure of an IP gate according to a second embodiment of the present invention.

Refer to FIG. 3, which illustrates network system comprised of virtual IP gates according the present invention. As shown in the FIG., the virtual network protocol gates 35 and 45 which employ this invention can establish two virtual networks 30 and 40 to allow any virtual networks 30 and 40 that connect with the legitimate network 50 to reuse the internet addresses in the same range, any network address in this range is a so-called virtual network address.

In this case, if a source console 34 on the virtual network 30 intends to connect with another destination console 44 on the virtual network 40, assuming the virtual network address of the source console 34 is 140.113.191.220, and the virtual network address of the destination console is also 140.113.191.220, such a connection is normally unlikely with internet, but the connection is possible with this invention.

First, in step 1 (S1), a source console 34 uses the domain name of a destination console server1.nctu.edu.tw as the destination console for external communication, the domain name will be recorded by a name recording module and forwarded to a name server module 32 of a domain server system.

In step 2 (S2), the above name server module 32 takes the domain name server1.nctu.edu.tw as the destination console name, acquires an internet address for the destination console through a domain name system, and forwards the obtained the internet address as the response to the source console 34. At this time, the internet address the source console 34 acquires is a legitimate internet address 140.114.215.81 of a virtual IP gate 45.

In step 3 (S3), the source console 34 inserts the network address 140.114.215.81 into a destination address field of a network packet and inserts a port number of a corresponding server program into a destination port number field. Take Telnet for instance, the destination port number is 23, an unused port number 1115 is selected to fill in a destination port number field for forwarding the packet to the virtual network 30. Next, the packet is transmitted to a virtual network protocol 35 through a routing mechanism such as OSPF and RIP.

In step 4 (S4), when the virtual IP gate 35, upon receiving the transmission packet, generates a new processing P1 (not shown) which creates a connection module and an address conversion module. The connection module will select an unused number 1025 as a source port number to establish connection with a legitimate internet 50. The address conversion module, upon receiving the packet, records the source address of the packet as 140.113.191.220 and the source port number as 1115, replaces the source address and the source port number of the packet with a legitimate internet address 140.115.17.20 of the virtual internet IP gate 35 and a newly created port number 1025, and transmits then through the connection the transmission packet to the legitimate internet 50. The packet takes gate 35 as the source console and gate 45 as the destination console and transmits to the virtual IP gate 45 through a regular routing mechanism on the internet 50.

In step 5 (S5), when the virtual IP gate 35, upon receiving the transmission packet, generates a new processing P2 (not shown) which creates a connection module and an automatic connection module. The connection module will first select an unused number 1081. The automatic connection module takes <140.114.215.81: 1081> as the <source address:

source port number> and <140.115.17.20: 1025> as the <destination address: destination port number> to retransmit a destination domain name inquiry packet for inquiring about the domain name of the destination console 44 the source console 34 intends to connect. The packet will be transmitted to the virtual IP gate 35 via the internet 50.

In step 6 (S6), the virtual IP gate 45, upon receiving the packet, transmits the packet to the aforementioned corresponding processing P1 according to the <source address: source port number> and <destination address: destination port number> of the packet. The processing P1 opens the address conversion module to convert the source address 140.114.215.81 and the source port number 1081 into <140.113.191.21: 1157>, where 1157 is any usable port number, and the destination address 140.113.17.20 and destination port number 1025 into <140.113.191.220: 54104>. (Please note: the number 54104 is homonymous with the phrase in Mandarin Chinese "This is 104," meaning a telephone directory assistance.)

In step 7 (S7), the source console 34, upon receiving the packet, will transmit it to a corresponding processing according to the <source address: source port number> and <destination address: destination port number>. The processing will know that it is a domain name inquiry packet upon receiving the pocket and then open the name recording module of S1 to acquire the recorded destination console name server1.nctu.edu.tw. (Please note: A name recording module is also a vital part of this invention, previous applications discard the destination domain name when a destination domain name is converted into a destination network address. This invention uses the name recording module to record the relationship between the destination domain name and a <source network address: source port number> that transmits the destination domain name and to open a server window for an automatic connection module to acquire the destination domain name.) Finally, a server window of the name recording module responds to a name response packet and informs the destination console 44 to be connected of the domain name.

In step 8 (S8), upon gate 35 receiving the name response packet, the address conversion module converts the <source address: source port number> and the <destination address: destination port number> and the connection module transmits the packet to the internet 50.

In step 9 (S9), gate 45, upon receiving the name response packet, uploads it to the automatic conversion module corresponding to the processing P2. The automatic connection module acquires the virtual network address 140.113.191.220 of the destination console according to the server domain name inquiry database carried with the packet. Next, the processing opens the address conversion module to convert the <source address: source port number> and the <destination address: destination port number> into <140.113.191.21: 1081> and <140.113.191.220: 23> and forwards the packet to the virtual network 40. The packet is transmitted to the destination console 44 via routing mechanism of the virtual network. By this time, a connection from the source console 34 to the destination console 44 is completed.

In step 10 (S10), if at this time the destination console 44 wants to transmit a response message, the message will be carried with a response packet and transmitted to the virtual internet 40, the response packet will be received by gate 45 via virtual network 40.

In step 11 (S11), gate 45, upon receiving the response packet, forwards the transmission packet back to the corresponding processing P2 according to the <source address: source port number> and the <destination address: destination port number> of the packet. The processing will also open the address conversion module to convert the addresses and forward them to internet 50. The response packet will be transmitted back to gate 45 via internet 50.

In step 12 (S12), gate 35, upon receiving the response packet, forwards the transmission packet back to the corresponding processing P1 according to the <source address: source port number> and the <destination address: destination port number>of the packet. The processing will also open the address conversion module to convert the addresses and forward them to internet 30. Finally, the response packet will be transmitted to the source console 34 via internet 30.

Subsequently, any packet transmitted from the source console 34 to the destination console 44, via the transmissions from gate 35 to gate 45 and from gate 45 to the destination console 44 will require no inquiry about the domain name.

To summarize, the two methods this invention employs create corresponding modules to process the transmissions between a legitimate internet and a virtual internet and establish the connection between the two internets by taking advantage of the virtual IP gate. These modules transmit the packet by identifying its <source address: source port number> and <destination address: destination port number>. Since current port number has 16 bits, a specific user module of a specific source console may not generate more than 65536 connections to a specific server program on a specific destination console. The number, in effect, has exceeded far more than current demand for general applications.

Moreover, the design principle of virtual IP gate can also be applied to any large scale network systems, such as those using supercomputers with the fastest connection or a small network for families or companies, contingent upon the operating capacities and the speed of connecting network framework of the virtual IP gate.

Consequently, the virtual IP gate of this invention can not only reuse the internet address in specific range without changing the routing mechanism of the existing internet addresses, but also resolve the insufficiency associated with the depletion of internet addresses by efficiently expanding the limited internet addresses. As far as application programs are concerned, the operating mechanism of this invention is transparent and needs not to modify application programs. If a user is connected through a console name, he will not feel the connection through a virtual IP gate; if the user is connected through an internet address, he only needs to establish the connection through a one-time selection of a console name. Besides, the virtual IP gate of this invention will enable a connection with two or more virtual internets which use the same internet addresses in the same range and a several-million-fold growth of usable internet addresses.

Although the present invention has been described in its preferred embodiment, it is not intended to limit the invention to the precise embodiment disclosed herein. Those who are skilled in this technology can still make various alterations and modifications without departing from the spirit and scope of this invention. Therefore, the scope of the present invention shall be defined and protected by the following claims and their equivalents.

What is claimed is:

1. A virtual internet protocol (IP) gate, between a legitimate internet and a virtual internet, said virtual internet addresses are selected from a specific range of said legitimate internet addresses, and said virtual IP gate comprising at least:

a connection module for establishing a connection with said virtual internet through at least a virtual internet address in the aforementioned specific range and a connection with said legitimate internet through at least an internet address not in the aforementioned specific range;

an address conversion module, corresponding to an address conversion port number, for receiving a transmission packet transmitted from a first processing module of said virtual internet to a second processing module of said legitimate internet, wherein the <source address: source port number> and <destination address: destination port number> of the transmission packet are the <first processing virtual internet address: first processing port number> corresponding to said first processing module and the <second processing internet address: second processing port number> corresponding to said second processing module; and said address conversion module is for recording the <first processing virtual internet address: first processing port number> of said first processing module and takes the <internet address of virtual IP gate: address conversion port number> corresponding to said address conversion module and the <second processing internet address: second processing port number> corresponding to said second processing module as the <source address: source port number> and <destination address: destination port number> of said transmission packet for forwarding said transmission packet to said second processing module, and said address conversion module is for receiving the response packet transmitted by said second processing module back to said first processing module, the <source address: source port number> and <destination address: destination port number> of the response packet are the <second processing internet address: second processing port number> corresponding to said second processing module and the <internet address of virtual IP gate: address conversion port number> corresponding to said address conversion module, and said address conversion module replaces the <destination address: destination port number> of said response packet with the <first processing virtual internet address: first processing port number> of said first processing module as recorded by said address conversion module, whereas the <source address: source port number> of said response packet remains unchanged, for transmitting said response packet back to the first processing module.

2. A virtual internet protocol (IP) gate, between a legitimate internet and a virtual internet, said virtual internet addresses are selected from a specific range of said legitimate internet addresses, and said virtual IP gate comprising at least:

a connection module for establishing a connection with said virtual internet through a virtual internet address in the aforementioned specific range and a connection with said legitimate internet through an internet address not in the aforementioned specific range;

a selection module corresponding to a selected port number for receiving a delivery packet transmitted from a source console of said legitimate internet to said virtual internet while said connection module establishes the connection, whereby the source address and destination address are the internet address of said source console and the internet address of said virtual IP gate, and said selection module opens a window or a list which enlists all console names or connection indices on said virtual internet when said connection module initially establishes the connection, and acquires, according to a selection signal provided by said source console, a virtual internet address corresponding to a destination console on said virtual internet for delivering said delivery packet to the destination console of said virtual internet; and an address conversion module, corresponding to an address conversion port number, for receiving a first transmission packet transmitted from a first processing module of said legitimate internet to a second processing module of said virtual internet, wherein the <source address: source port number> and <destination address: destination port number> of the first transmission packet are the <first processing internet address: first processing port number> corresponding to said first processing module and the <internet address of virtual IP gate: selection port number> corresponding to said virtual IP gate; and said address conversion module is for recording a connection relationship between the <first processing virtual internet address: first processing port number> and the <internet address of virtual IP gate: second processing port number> corresponding to said transmission packet and takes the <internet address of virtual IP gate: address conversion port number> corresponding to said address conversion module and the <second processing internet address: second processing port number> corresponding to said second processing module as the <source address: source port number> and <destination address: destination port number> of said transmission packet for forwarding said transmission packet to said second processing module of said virtual internet, and said address conversion module is for receiving the response packet transmitted from said second processing module back to said first processing module, the <source address: source port number> and <destination address: destination port number> of the response packet are the <second processing virtual internet address: second processing port number> corresponding to said second processing module and the <internet address of virtual IP gate: address conversion port number> corresponding to said address conversion module, and said address conversion module replaces, according to the recorded relationship, the <source address: source port number> and the <destination address: destination port number> of said response packet with the <internet address of virtual IP gate: second processing port number> being the <source address: source port number> and with the <first processing internet address: first processing port number> of said first processing module being the <destination address: destination port number> of said response packet, for transmitting said response packet back to said first processing module of said internet.

3. The virtual IP gate of claim 1, wherein said selection module, upon establishing a connection-oriented connection, checks whether it receives a control packet when said selection module needs to recycle system resources in order to disconnect and initiate an action of system resources recycling; and, upon establishing a connectionless connection, detects whether no transmission action is taken after a specific time elapses in order to determine whether to disconnect or initiate said system recycling action.

4. The virtual IP gate of claim 1, wherein said source console comprises a name recording module for recording the console name of its corresponding console when said connection establish the connection; and said virtual IP gate further comprises an automatic connection module for inquiring said source console when said virtual IP gate receives said transmission packet for the first time, acquiring the destination console name corresponding to said transmission packet, and acquiring the virtual internet address corresponding to said destination console on said virtual internet based on the inquiry of said destination console into the database of said virtual IP gate for forwarding said transmission packet to said destination console.

5. The virtual IP gate of claim 1, wherein said address conversion module is for receiving a second transmission packet of said fourth processing module transmitted from a third processing module of said legitimate internet to said legitimate internet, with the <source address: source port number> and <destination address: destination port number> of the second transmission packet being the <third processing virtual internet address: third processing port number> corresponding to said third processing module and the <fourth processing internet address: fourth processing port number> corresponding to said fourth processing module;

said address conversion module records the <third processing virtual internet address: third processing port number> of said third processing module corresponding to said second transmission packet and uses the <internet address of virtual IP gate: address conversion port number> corresponding to said address conversion module and the <fourth processing internet address: fourth processing port number> as the <source address: source port number> and <destination address: destination port number> of said second transmission packet in order to transmit said second transmission packet to said fourth processing module; and said address conversion module is used for receiving a second response packet transmitted from said fourth processing module to said third processing module, with its <source address: source port number> and <destination address: destination port number> being the <fourth processing internet address: fourth processing port number> corresponding to said fourth processing module and the <virtual internet address of virtual IP gate: address conversion port number> corresponding to said address conversion module, said address conversion module 13 replaces the <destination address: destination port number> of said second transmission packet with the <first processing virtual internet address: first processing port number> of said first processing module corresponding to the recording of said address conversion module, while maintaining the <source address: source port number> of said second response packet unchanged, and transmits said second response packet back to said third processing module.

6. The virtual IP gate of claim 1, wherein said transmission packet is a TCP/IP packet.

7. The virtual IP gate of claim 1, wherein said response packet is a TCP/IP packet.

8. The virtual IP gate of claim 1, wherein said delivery packet is a TCP/IP packet.

9. The virtual IP gate of claim 1, wherein said legitimate internet comprises a name server module for recording each console name on said legitimate internet and its corresponding legitimate internet address and assigning the legitimate internet address corresponding to each console name on said virtual internet as the internet address of said virtual IP gate.

10. The virtual IP gate of claim 4, wherein:

said address conversion module is for receiving a second transmission packet of said fourth processing module transmitted from a third process module of said legitimate internet to said legitimate internet, with the <source address: source port number> and <destination address: destination port number> of the second transmission packet being the <third processing virtual Internet address: third processing port number> corresponding to said third processing module and the <fourth processing internet address: fourth processing port number> corresponding to said fourth process module;

said address conversion module records the <third processing virtual internet address: third processing port number> of said third processing module corresponding to said second transmission packet and uses the <internet address of virtual IP gate: address conversion port number> corresponding to said address conversion module and the <fourth processing internet address: fourth processing port number> as the <source address: source port number> and <destination address: destination port number> of said second transmission packet in order to transmit said second transmission packet to said fourth processing module; and said address conversion module is used for receiving a second response packet transmitted from said fourth processing module to said third processing module, with its <source address: source port number> a nd <destination address: destination port number> being the <fourth processing internet address: fourth processing port number> corresponding to said fourth processing module and the <virtual internet address of virtual IP gate: address conversion port number> corresponding to said address conversion module, said address conversion module 13 replaces the <destination address: destination port number> of said second transmission packet with the <first processing virtual internet address: first processing port number> of said first processing module corresponding to the recording of said address conversion module, while maintaining the <source address: source port number> of said second response packet unchanged, and transmits said second response packet back to said third processing module.

11. A network framework comprised of virtual IP gates for connecting a legitimate internet and a plurality of virtual internets comprises:

a first virtual IP gate, between said legitimate internet and a first virtual internet, said first virtual internet addresses are selected from a first range selected of said legitimate internet; and a second virtual IP gate, between said legitimate internet and a second virtual internet, said second virtual internet addresses are selected from a second range of said legitimate internet;

wherein, said first virtual IP gate comprises:

a first connection module for establishing connection with said first virtual internet through the virtual internet address of said internet IP address and establishing connection with said legitimate internet through the internet address of said virtual IP gate within the first range;

a first address conversion module, corresponding to a first address conversion port number, for receiving a first transmission packet transmitted from a first processing module of said virtual internet to a second processing module of said legitimate internet, wherein the <source address: source port number> and <destination address: destination port number> of said first transmission packet are the <first processing virtual internet address: first processing port number> corresponding to said first processing module and the <second processing internet address: first processing port number> corresponding to said second processing module;

said first address conversion module is for recording the <first processing virtual internet address: first processing port number> of said first processing module corresponding to said transmission packet and takes the <internet address of first virtual IP gate: second processing port number> corresponding to said first address conversion module and the <second processing internet address: second processing port number> corresponding to said second processing as the <source address: source port number> and <destination address: destination port number> of said first transmission packet for forwarding said first transmission packet to said second processing module; and said first address conversion module is for receiving a first response packet transmitted from said second processing module back to said first processing module, wherein the <source address: source port number> and <destination address: destination port number> of said first response packet are the <second processing internet address: second processing port number> corresponding to said second processing module and the <internet address of first virtual IP gate: first address conversion port number> corresponding to said first address conversion module, and said first address conversion module replaces the <destination address: destination port number> of said first response packet with the <first processing internet address: first processing port number>, while maintaining the <source address: source port number> of said first processing module unchanged, for transmitting said first response packet back to said first processing module;

said second virtual IP gate comprises:
a second connection module for establishing connection with said second virtual internet through the virtual internet address of said second virtual IP gate and establishing connection with said legitimate internet through the internet address of said second virtual IP gate within the second range;

a second address conversion module, corresponding to a second address conversion port number, for receiving a second transmission packet transmitted from a third processing module of said legitimate internet to a fourth processing module of said second virtual internet, wherein the <source address: source port number> and <destination address: destination port number> of said second transmission packet are the <third processing virtual internet address: third processing port number> corresponding to said third processing module and the <internet address of second virtual IP gate: fourth processing port number> corresponding to said second virtual IP gate;

said second address conversion module is for recording the connecting relationship between the <third processing internet address: third processing port number> of said third processing module corresponding to said second transmission packet and the <internet address of second virtual IP gate: fourth processing port number> and takes the <internet address of second virtual IP gate: fourth processing port number> corresponding to said second address conversion module and the <fourth processing virtual internet address: fourth processing port number> corresponding to said fourth processing module as the <source address: source port number> and <destination address: destination port number> of said transmission packet for forwarding said second transmission packet to said fourth processing module; and said second address conversion module is for receiving the second response packet transmitted from said fourth processing module back to said third processing module, wherein the <source address: source port number> and <destination address: destination port number> of said second response packet are the <fourth processing internet address: fourth processing port number> corresponding to said fourth processing module and the <internet address of second virtual IP gate: second address conversion port number> corresponding to said second address conversion module, and said second address conversion module takes the <third processing internet address: third processing port number> of said third processing module as the <destination address: destination port number> of said second response packet, and the <internet address of second virtual IP gate: fourth processing port number> as the <source address: source port number> of said second response packet, for transmitting said second response packet back to said first processing module; and a selection module for receiving a second transmission packet transmitted from a source console on said legitimate internet to said second virtual internet, wherein the source address and the destination address of said second transmission packet are the internet address of the source console and the internet address of the second virtual IP gate corresponding to said selection module, respectively, and said selection module opens a window or a list to enlist all console names or connection indices on said second virtual internet, and acquires, according to a selection signal provided by said source console, a virtual internet address of a destination console on said second virtual internet for transmitting said transmission packet to the destination console of said second virtual internet.

12. The network framework of claim 11, wherein the addresses of said first range and said second range are formed with the addresses in the same range on said legitimate internet.

13. The network framework of claim 12, wherein said third processing module and said second processing module are the same module, hence the connection of the first processing module of said first virtual internet with the fourth processing module of said second virtual internet is established.

14. The network framework of claim 13, wherein said third processing module and said second processing module are the same module existing in said first virtual IP gate.

15. The network framework of claim 13, wherein said third processing module and said second processing module are the same module existing in said second virtual IP gate.

16. The network framework of claim 13, wherein said third processing module and said second processing module are the same module existing in any normal console in said internet.

* * * * *